United States Patent
Comer et al.

[19]

[11] Patent Number: 6,055,548
[45] Date of Patent: *Apr. 25, 2000

[54] COMPUTERIZED SPREADSHEET WITH AUTO-CALCULATOR

[75] Inventors: Ross Comer, Bothell; David Russell Williams, Jr., Issaquah, both of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/657,353

[22] Filed: Jun. 3, 1996

[51] Int. Cl.⁷ ........................................................ G06F 17/21
[52] U.S. Cl. .......................... 707/503; 707/538; 345/346
[58] Field of Search ................................... 707/503, 504, 707/538; 345/346, 340, 335

[56] References Cited

U.S. PATENT DOCUMENTS

| | | | |
|---|---|---|---|
| 5,510,980 | 4/1996 | Peters | 707/503 |
| 5,623,282 | 4/1997 | Graham et al. | 345/121 |
| 5,685,001 | 11/1997 | Capson et al. | 707/503 |
| 5,874,963 | 2/1999 | Johnson et al. | 345/348 |

*Primary Examiner*—Joseph H. Feild
*Attorney, Agent, or Firm*—Lee & Hayes, PLLC

[57] ABSTRACT

A computerized spreadsheet automatically calculates a function using a set of selected cells as the cells are selected and immediately displays the result in real-time, without requiring entry of a function into a cell to perform the calculations. The computerized spreadsheet has multiple cells which are selectable by an indicator, such as a pointer or highlight bar. As the author selects one or more cells, an auto-calculator automatically calculates a preset function using the one or more selected cells and displays the result. For example, suppose the function is to sum all the values in a group of cells. As the author selects the cells within the group, the auto-calculator quickly computes the sum of the presently selected cells and displays the result. If the author changes the selection, the calculation is continuously updated and displayed in real-time. In this manner, the author can view intermediate calculations without having to write or embed a formula for them within the spreadsheet.

23 Claims, 5 Drawing Sheets

COMPUTERIZED SPREADSHEET WITH AUTO-CALCULATOR

TECHNICAL FIELD

This invention relates to computerized spreadsheets.

BACKGROUND OF THE INVENTION

Computerized spreadsheets are widely used for organizing numerical and textual data in such environments as accounting, financial/investments, inventory, and the like. The spreadsheets consist of rows and columns of individual cells. The columns are organized by letter—Columns A, B, C, etc.—and the rows are organized by number—Rows 1, 2, 3, etc. Each cell is identified by a combination of column letter and row number. Cell "B3," for instance, is in column B and row 3. Numerical and textual data are entered into the cells of the spreadsheet according to the organization imposed by the author. The cells can be formatted to present the numbers and text in a desired appearance.

Conventional spreadsheets also permit an author to define mathematical functions within individual cells. The functions are set apart from normal data by use of a leading descriptor entry, such as an "=" sign. It is common for the mathematical functions entered in one cell to use data contained in other cells. The function itself is not displayed in the cell; rather, the cell displays the results of the function.

To perform calculations on the data entered into the spreadsheet, the author has to explicitly define the function and enter it in one of the cells. One typical spreadsheet example is to sum all of the numbers in a column. The author selects a cell in the spreadsheet which will be used to show the summation, and in that cell, defines a summation function which adds the values of the particular cells in the column. To compute the summation of numbers residing in cells B3 to B12 and show that sum in cell B13, the author enters in cell B13 one of the following equations:

=SUM(B3:B12)

=B3+B4+. . .+B12+B13

Notice that the function begins with the "=" descriptor to identify that the cell contains a function, and not text or numerical data.

For commonly used equations, spreadsheets typically have a predefined list of functions from which the author may choose. The list can be presented in a pull-down menu, or the like. The author simply chooses a particular cell and selects a function from the predefined list. The spreadsheet enters the selected function into the chosen cell, so that the author does not have to type in the function. In addition to predefined lists, one present-day spreadsheet marketed under the name Excel by Microsoft Corporation offers a "function wizard" which guides the author step-by-step through the parts of a function to ensure entry of the appropriate cell information and parameters. While the predefined lists and function wizards provide shortcuts to improve operation efficiency, they too result in entry of a function within a designated cell.

There are occasions, however, when an author only wants a quick, temporary calculation that is not intended to be part of the workbook. For instance, the author might wish to know the subtotal of a group of cells, or to analyze data within a set of cells to find a subset of those cells which produce a certain value. With conventional spreadsheets, the author is forced to enter the formula in a cell (either by entering the function, selecting one from a menu, or using a function wizard), view the result, and subsequently go back and delete the function from the cell to remove it from the workbook.

Accordingly, there is a need to improve computerized spreadsheets to handle intermediate calculations without having to enter formulas into the worksheet.

SUMMARY OF THE INVENTION

This invention concerns techniques for performing automatic calculations in a computerized spreadsheet without creating a function to perform the calculations. The computerized spreadsheet has multiple cells which are selectable by an indicator, such as a pointer or highlight bar. As the author selects one or more cells, an auto-calculator automatically calculates a predefined function using the one or more selected cells and then promptly displays the result. For example, suppose the function is to sum all the values in the selected cells. As the author selects cells, the auto-calculator quickly computes the sum of the selection and displays the result. As the author changes the selection (e.g., moving the pointer to include another cell), the calculation is continuously updated in real-time. In this manner, the author can view intermediate calculations without having to write or embed a formula within the spreadsheet.

The calculations can be made in one of two ways. One approach is to compute the function each time a new cell is selected by repeatedly using all of the selected cells. A second approach is to compute the function for the present selection and temporarily cache the result. Then, as a new cell is selected, compute the function using the new cell and the cached result to incrementally adjust the calculation.

Once the calculation is made, the result is immediately displayed. In the described implementation, the spreadsheet is implemented in a graphical user interface window having a toolbar adjacent to the rows and columns of cells and a moveable pointer. The result can be displayed in a pane of the tool bar or in a tip-window beside the pointer.

DETAILED DESCRIPTION OF THE PREFERRED EMBODIMENT

Figure 1:
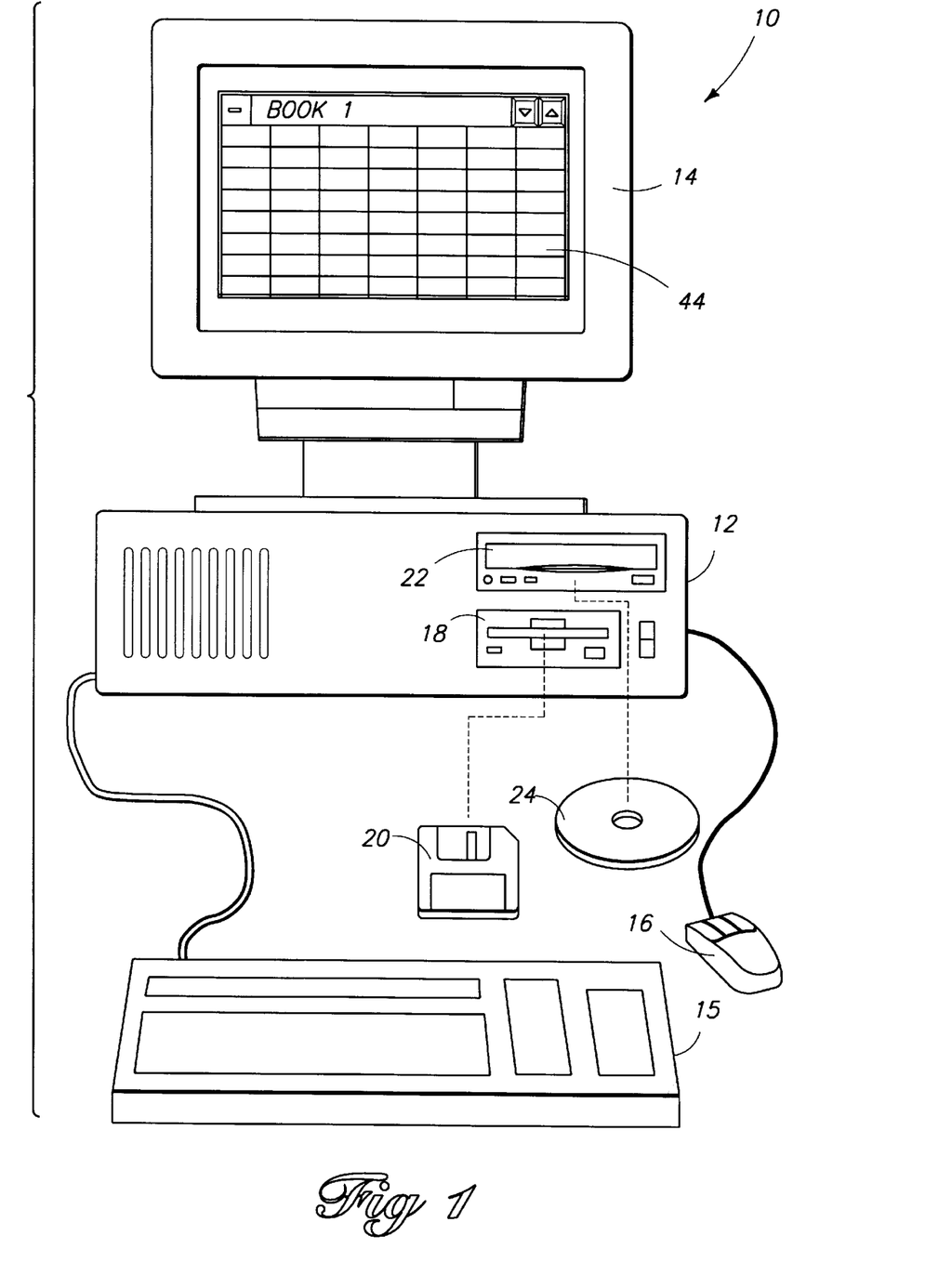
FIG. 1 is a diagrammatic illustration of a computer executing a spreadsheet program according to an example implementation of this invention.

FIG. 1 shows a computer 10 in the form of a conventional desktop IBM-compatible computer. The computer 10 has a central processing unit (CPU) 12, a display monitor 14, a keyboard 15, and a mouse 16. The computer 10 also has a floppy disk drive 18 for interfacing with a compatible floppy memory diskette 20 (e.g., 3.5" form factor), and an optical disk drive 22 for interfacing with a compatible CD-ROM 24.

The computer 10 might also include another input device in addition to, or in lieu of, the keyboard 15 and mouse 16 including such devices as a track ball, stylus, or the like.

Figure 2:
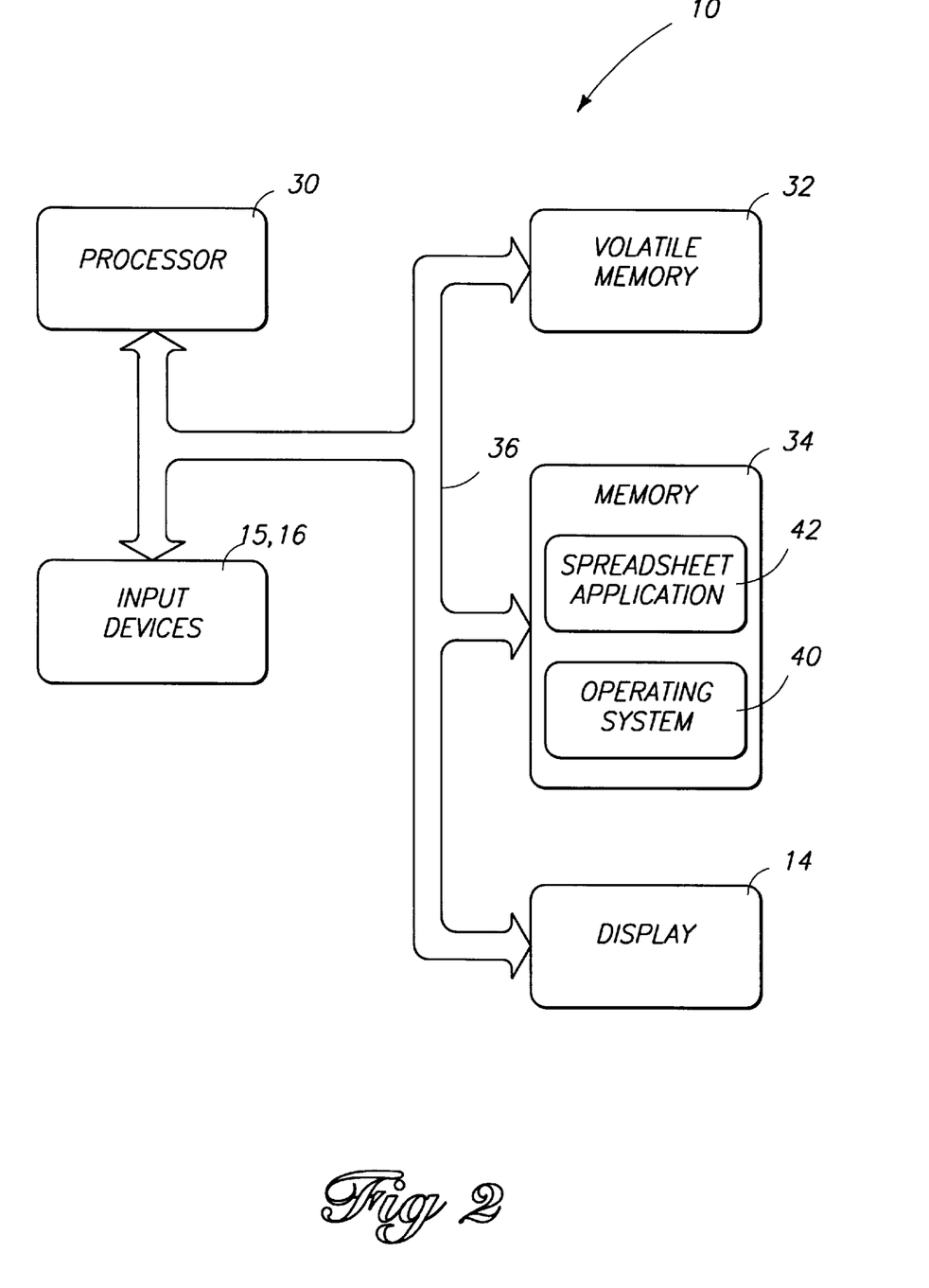
FIG. 2 is a block diagram of the FIG. 1 computer.

FIG. 2 shows a functional block diagram of the computer 10. The computer 10 has a processor 30, a volatile memory 32 (e.g., RAM), and a non-volatile memory 34 interconnected by an internal bus 36. The non-volatile memory 34 can be implemented as integrated circuit chips (e.g., ROM, EEPROM), disk drive(s) (e.g., floppy, optical, hard), or a combination. The display 14 is connected to the bus 36 through appropriate hardware interface drivers (not shown). Additionally, the input devices 15, 16 are connected to supply data to the bus 36 via appropriate I/O ports, such as serial RS232 ports.

The computer 10 runs an operating system 40 which supports multiple applications. The operating system 40 is stored on the non-volatile memory 34 and executed on the processor 30. The operating system is preferably a multi-tasking operating system which allows simultaneous execution of multiple applications, although aspects of this invention may be implemented using a single-tasking operating system. The operating system preferably employs a graphical user interface windowing environment which presents the applications or documents in specially delineated areas of the display screen called "windows." Each window has its own adjustable boundaries which enable the user to enlarge or shrink the application or document relative to the display screen. Each window can act independently, including its own menu, toolbar, pointers, and other controls, as if it were a virtual display device. One preferred operating system is a Windows® brand operating system sold by Microsoft Corporation, such as Windows® 95 or Windows NT™ or other derivative versions of Windows®. However, other operating systems which provide windowing environments may be employed, such as the Macintosh Finder from Apple Corporation and the OS/2 Presentation Manager from IBM.

A computerized spreadsheet application 42 is stored in the non-volatile memory 34. When activated, the spreadsheet application 42 runs on the operating system 40 while executing on the processor 30. As one example, the spreadsheet application 42 is a program manufactured and sold under the name Excel by Microsoft Corporation. The spreadsheet application 42 can be loaded into the memory 34 from the floppy diskette 20 or CD-ROM 24, or alternatively, downloaded from a network via a network port (not shown).

It is noted that the invention is described within the illustrated context of a familiar desktop computer, as shown in FIG. 1. An example computer includes a 386-equivalent microprocessor, or better, with four to eight megabytes of RAM. This example computer is capable of running a multitasking operating system with a windowing environment. However, aspects of this invention might also be employed in other forms of computing devices, such as laptop computers, hand held computers, portable personal information managers (PIMs), and the like. In these devices, the spreadsheet application may be configured to run on a single-tasking operating system which does not support a windowing environment.

With reference again to FIG. 1, the author launches the spreadsheet application in a customary fashion by, for example, clicking on an icon or choosing the program from a menu. The graphical user interface of the spreadsheet application is displayed on the monitor 14 and bounded within a window 44, as is customary in a graphical user interface windowing environment. The window 44 is associated with the spreadsheet application, and is referred to as the "spreadsheet window."

Figure 3:
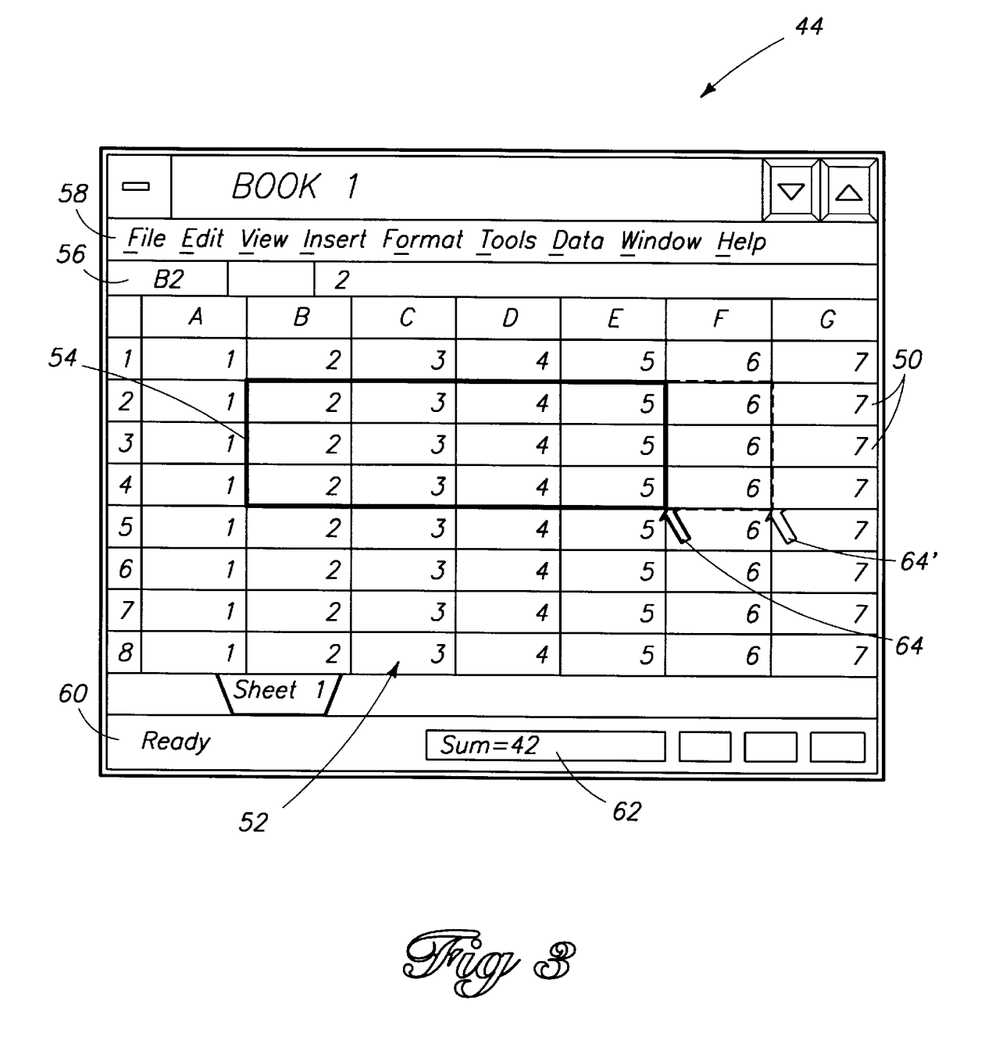
FIG. 3 is a diagrammatic illustration of a graphical user interface window of the spreadsheet showing a first technique for selecting cells, automatically calculating a result, and displaying the result.

FIG. 3 shows the spreadsheet window 44 in more detail. It includes multiple rows and columns of individual cells 50 arranged within a cell space 52. The columns are demarcated with letters A, B, C, etc. along the top border of the cell space 52. The rows are identified by numbers 1, 2, 3, etc. along the left side of the cell space 52. Individual cells are identified by their corresponding column letter and row number intersection. For instance, cell D4 is at the intersection of column D and row 4.

Data in the form of text or numerical values may be entered into each cell. Individual cells can also contain functions which operate on data or functions contained in other cells. The functions are denoted by use of a descriptor entry, such as an "=" sign, which indicates to the spreadsheet program that the author has entered a formula in the cell as opposed to data. For purposes of explanation, numerical data is entered in each of the cells, with column A cells containing the number "1", column B cells containing the number "2", column C cells containing s the number "3", and so on.

A focus frame 54 is active in the cell space 52 to identify one or more cells. The author moves or changes the size of the focus frame 54 using the mouse or keyboard. For example, when an author selects cells with a mouse, the author typically moves the mouse over the first cell in the selection, presses and holds the mouse's left button, and moves the mouse to the last cell in the selection. As the mouse moves with the left button depressed, any cells between the starting cell and the current cell are selected.

Figure 5:
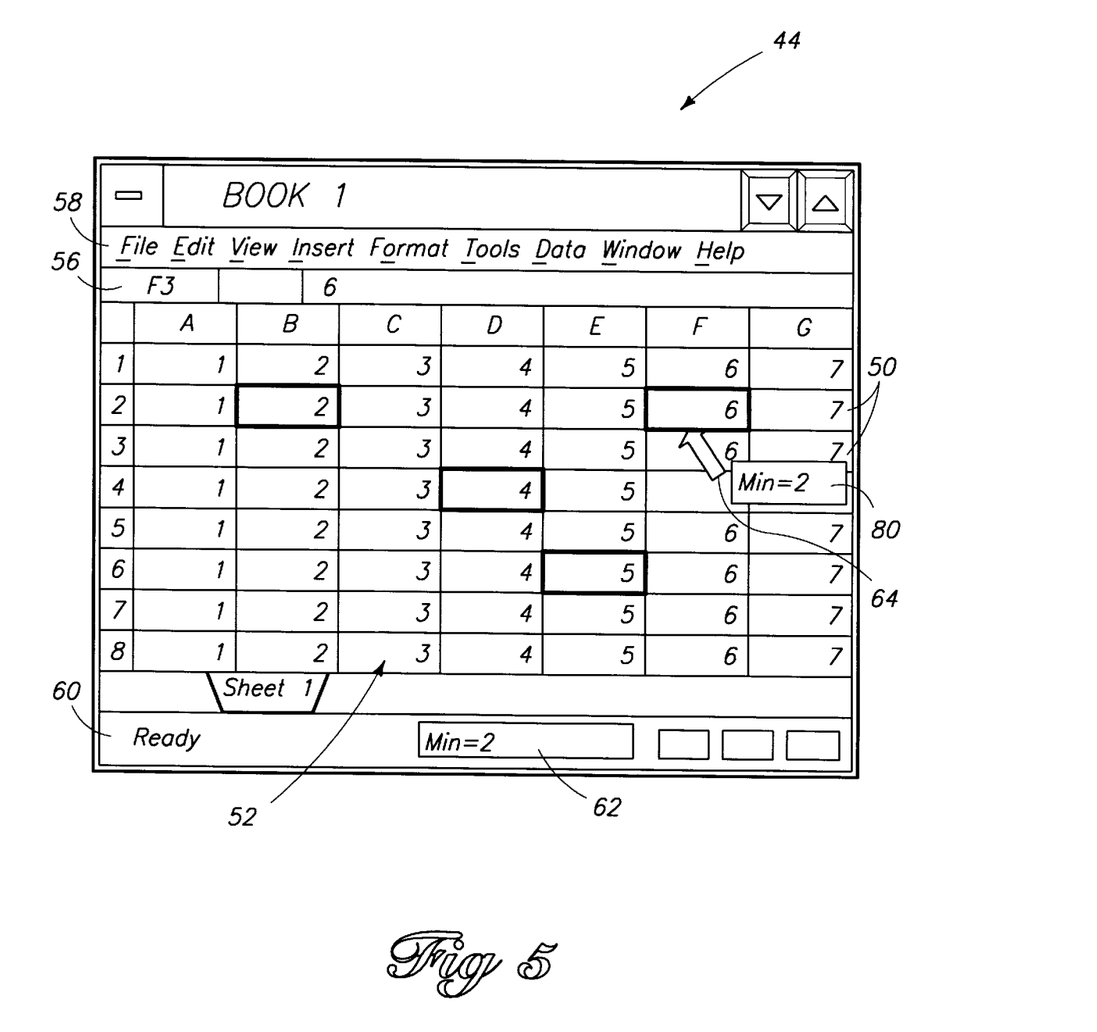
FIG. 5 is a diagrammatic illustration of the spreadsheet graphical user interface window showing a second technique for selecting cells, automatically calculating a result, and displaying the result.

In the illustrated example, the focus frame 54 is a highlighted box that encompasses a group of twelve selected cells. This selection is made by placing the focus frame initially on cell B2, and dragging the box to encompass the other eleven cells. Alternatively, the selection can be made using the keyboard by holding down the "SHIFT" key and manipulating the arrow keys to define the cell range. The selected cells are contiguous in this illustration, but the author is free to select non-contiguous cells as well, as illustrated in FIG. 5 by the multiple focus frames around non-adjoining cells. Multiple non-contiguous cells can be selected, for example, by depressing the "CTRL" key and clicking on the desired cells with the mouse.

An operation space 56 is provided above the cell space 52 to show the present selection. In this example, the operation space 56 includes an alphanumeric value "B2" which indicates that the present selection began on space B2 and a corresponding value "2" which indicates that the contents of cell B2 is the number 2.

The spreadsheet window 44 has an upper toolbar 58 located above the operation space 56. The upper toolbar 58 has an assortment of pull down menus labeled "File," "Edit," "View," "Insert," "Format," "Tools," "Data," "Window," and "Help." The author opens a pull down menu associated with the label through common techniques, such as by clicking on the label with a mouse pointer, or by entering the key letter in the label with an "ALT+letter" operation on the keyboard.

The spreadsheet window 44 also has a status bar 60 situated beneath the cell space 52. The status bar 60 has a status description "Ready" and an assortment of predefined panes which are active when the corresponding features are being used and inactive when the corresponding features are not being used. A results pane 62 is provided in the status bar 60 to display the results of the auto-calculator, as described below in more detail.

The spreadsheet UI also supports a movable pointer or other indicator 64 which can be moved across the window 44. The author manipulates the pointer 64 using a mouse or arrow keys on a keyboard.

The spreadsheet program includes an auto-calculator module that performs calculations automatically on the fly as the author selects cells, without requiring the author to enter a formula in a cell. The auto-calculator computes a preset function using the selected cells as those cells are selected. The function may be based upon the cell itself or its position within the cell space. For instance, the function "Column" returns the column number of the selected cell and the function "Rows" returns the number of rows in the selection. The function may also be based upon the data contents within the cells. For instance, the function "Sum" adds all of the values in the selected cells and the function "Max" returns the maximum value of all values in the selected cells.

With reference to FIG. 3, suppose that the auto-calculator is set to perform the "Sum" function. Using the mouse, the author moves the pointer 64 to cell B2 and left-clicks the mouse (i.e., depresses the leftmost button on the mouse) to move the focus frame 54 to cell B2. When the single cell B2 is selected, the auto-calculator easily computes the sum of the single cell B2 as being "2". This result is immediately displayed in the results pane 64, with the legend "Sum=" followed by the value "2". Suppose the user then drags the focus frame 54 to its illustrated size to select twelve cells B2–E2, B3–E3, and B4–E4. The auto-calculator automatically computes the sum of these twelve cells as the author selects them with the pointer 64. In this example, the sum of all twelve cells is 42. This result is displayed immediately in the results pane as "Sum=42."

Now suppose that the author moves the pointer rightward to include cells F2–F4 within the selection, as indicated by the dashed focus frame and the pointer 64'. As the author slides the pointer to encompass these three new cells, the auto-calculator immediately calculates a new sum which includes cells F2–F4 and displays the result "Sum=60" in real-time within the results pane 62.

The auto-calculator is preferably implemented in one of two ways. In the first implementation, the auto-calculator is configured to compute the function each time a new cell or group of cells is selected. Accordingly, with reference to the example in FIG. 3, the auto-calculator re-computes the sum as the author slides the pointer from block B2 to the twelve cell selection and then again as the author slides the pointer to form the fifteen cell selection. The results are immediately displayed with each computation and thus the author can view a changing value as he/she alters the selection by moving the pointer about the spreadsheet.

Within this first implementation, there are essentially two ways to perform the computations. The first way is to make each calculation using repeatedly all of the selected cells. For example, in the example change from a twelve cell selection area to a fifteen cell selection area, the auto-calculator is configured to re-compute the new selection by summing the contents of all fifteen cells. The second way to perform the computation is to make incremental calculations as each new cell or group of cells is added, as opposed to re-computing the entire set of cells each time. According to this second technique, the auto-calculator caches or temporarily stores in memory the results of the present selection. When the author selects another cell or group of cells, the auto-calculator uses the stored results and the new value(s) to derive a new result, which is then cached. With reference to the example of FIG. 3, the second technique calls for caching the result "42" for the twelve cell selection. When the author moves the pointer to add cells F2–F4, the auto-calculator retrieves the previous result "42" from memory and adds the new cell values (a total of 18) to compute a new result of "60."

In the second implementation, the auto-calculator is configured to compute the function after the author has made the entire selection. For instance, once the author has selected the desired cells and releases the mouse button, the auto-calculator computes the function using all of the cells in the selection and displays the result.

In each of the above implementations, the function is computed automatically by the spreadsheet program. There is no equation entered into any cell. That is, the calculation is made without the author having to enter a formula into a cell, or retrieve a formula from a pull-down menu, or use a function wizard to help define a formula. This automatic calculation is made while the author manipulates the pointer, without requiring any other input, to provide the author with useful intermediate results. Additionally, since there is no embedded formula to contend with, the automatic calculation eliminates the author's need to remember where an intermediate formula is located in the worksheet and to delete it from the worksheet if it is no longer needed.

Figure 4:
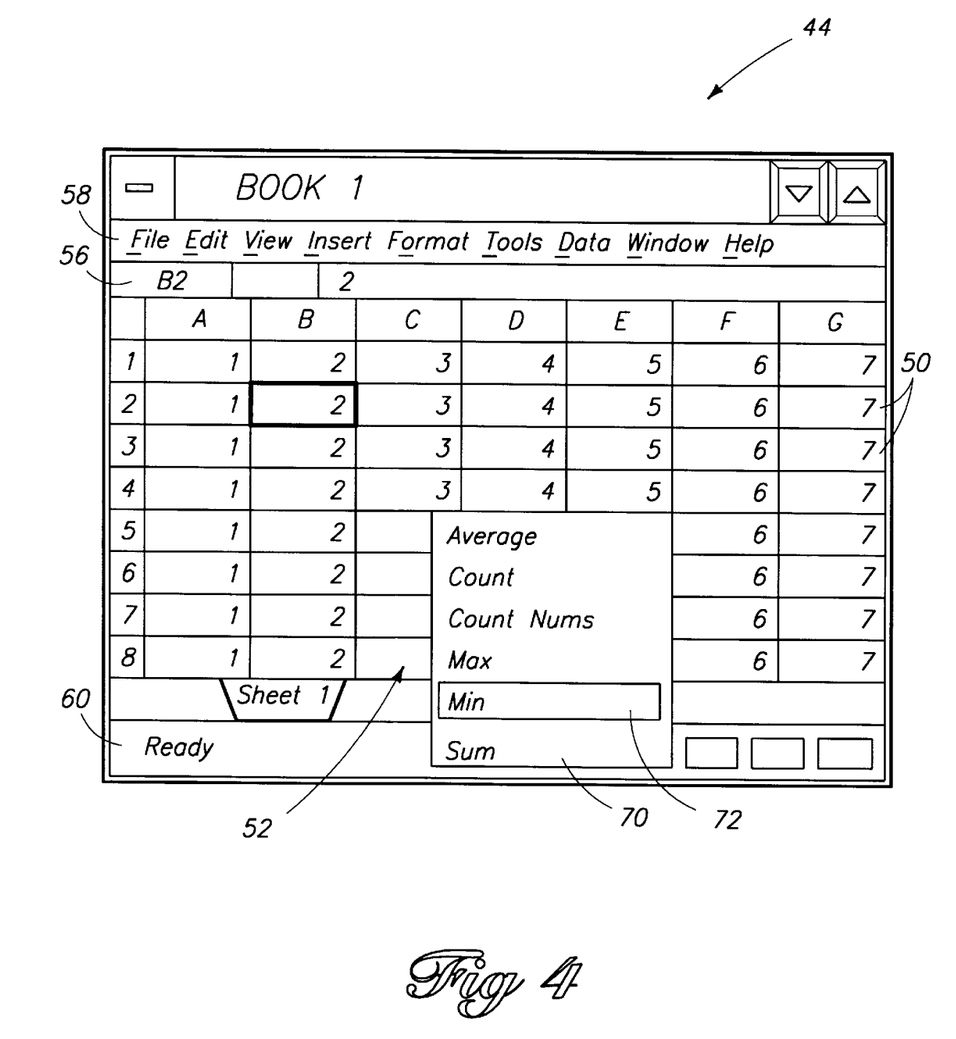
FIG. 4 is a diagrammatic illustration of the spreadsheet graphical use interface window showing a pop-up menu for setting or changing a function that is automatically calculated.

The author can change functions for the auto-calculator. FIG. 4 shows one possible way to change functions using a pop-up menu 70. To display the menu 70, the author activates the results pane 62 by right-clicking on the pane (i.e., depressing the rightmost button on the mouse) or using other activation techniques. The pop-up menu 70 lists the available functions. In this illustration, there are six functions from which to choose, including "Average," "Count," "Count Nums," "Max," "Min," and "Sum." Suppose that the author selects the "Min" function which finds the minimum value in the selection. The author moves the highlight bar 72 to the "Min" label and selects it. The pop-up menu 70 disappears and the auto-calculator is now set to compute the "Min" function. In addition to pop-up menus, the ability to change functions could be implemented other ways, such as through drop-down menus, drop-down icons, or dialog boxes.

FIG. 5 shows the spreadsheet window 44 after the "Min" function is set. The present function is depicted in the results pane 62 as "Min" to inform the author of which function will be performed automatically. In FIG. 5, the author has selected non-contiguous cells B2, D4, E6, and F3 and the pointer 64 is currently active at cell F3. Based upon these four selected cells, the auto-calculator has computed the "Min" function and displays the result of "2" in the results pane 62.

The result of the automatic calculation is displayed immediately upon completion of that calculation. In the FIGS. 3 and 5 illustrations, the results are displayed in the results pane 62 of the status bar 60. However, the results can be displayed in other places of the spreadsheet UI. For instance, in FIG. 5, the results are displayed in a graphical tip pane 80 which is adjacent to, and moves with, the pointer 64.

Table 1 is a sample list of functions that can be used by the spreadsheet auto-calculator module on a selection of one or more cells.

TABLE 1

| Function | Task |
| --- | --- |
| And | True if all cell arguments are true |
| Areas | Counts number of areas in a selection |
| AveDev | Average of the absolute deviations of data points from their mean |
| Average | Average of all cell arguments |
| Column | Column number of selected cell |
| Columns | Counts number of columns in selection |
| Count | Counts how many numbers are in the list of arguments |
| CountNums | Counts how many values are in the list of arguments |
| CountBlank | Counts number of blank cells |
| DevSq | Computes sum of squares of deviations |
| GeoMean | Geometric Mean |
| HarMean | Harmonic Mean |
| Kurt | Kurtosis of a data set |
| Max | Maximum value in a list of arguments |
| Median | Median of the values in a selection |
| Min | Minimum value in a list of arguments |
| Mode | most common value in a data set |
| NormsDist | Standard Normal Cumulative Distribution |
| Or | True if any cell argument is true |
| Row | Row number of selected cell |
| Rows | Counts number of rows in selection |
| Skew | Skewness of a distribution |
| StDev | Estimates standard deviation based on a sample |
| StDevP | Calculates standard deviation based on the entire population |
| Sum | Adds cell arguments |
| SumProduct | Sum of products of corresponding array components |
| SumSq | Sum of squares of arguments |
| Var | Estimates variance based on a sample |
| VarP | Calculates variance based on the entire population |

In addition to these functions, the auto-calculator module can be configured to use a user-defined function (UDF). A UDF can be a formula that the author writes, a program written in a built-in macro language (e.g., Excel supports XLM and VBA as internal macro languages), or through a separate program that interfaces with the spreadsheet. The UDF uses the current selected cells to perform a calculation and return the result to Excel.

The preferred implementation of this invention has been described in the context of a computerized spreadsheet. It is noted that aspects of this invention can be used in other computerized applications that have spreadsheet functionality which allows selection of numbers and performs computations. For instance, some database programs and word processing programs permit construction of tables or other grid-like structures which contain numbers, and provide at least some rudimentary computations such as sum, min, and max. An auto-calculator module described above can be incorporated into such programs to perform automatic computations as the author moves about such tables or structures.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

We claim:

1. A computer-implemented method for operating a computer application with spreadsheet functionality, comprising the following steps:

displaying a graphical user interface window having a plurality of cells operatively associated with the spreadsheet functionality and at least one data display region not operatively associated with the spreadsheet functionality;

enabling selection of one or more of the plurality of cells;

automatically computing an operator-defined function, based solely on the selected cells as inputs, to produce a result as the cells are being selected without entering the function into a non-selected cell; and immediately displaying the result in the at least one region not operatively associated with the spreadsheet functionality.

2. A computer-implemented method as recited in claim 1, wherein the one or more selected cells contain data, and the computing step comprises automatically computing the operator-defined function based upon the data contained in the one or more cells.

3. A computer-implemented method as recited in claim 1, further comprising the following steps:

enabling a user to choose another function; and subsequently automatically computing the other function using the selected cells.

4. A computer-implemented method as recited in claim 1, wherein the operator-defined function is selected from a group of functions comprising:

summation, maximum, minimum, average, count, and count number.

5. A computer-implemented method as recited in claim 1, wherein the graphical user interface window includes a toolbar having the at least one data display region not operatively associated with the spreadsheet functionality.

6. A computer-implemented method as recited in claim 1, wherein the graphical user interface window includes a movable pointer having the at least one data display region not operatively associated with the spreadsheet functionality adjacent to the pointer.

7. A computer-implemented method as recited in claim 1, wherein the computing step comprises automatically computing the function each time the selected cells changes from a first group of cells to a second group of cells.

8. A computer-implemented method as recited in claim 7, further comprising the step of displaying the result from said computation each time a computation is made.

9. A computer-implemented method as recited in claim 7, further comprising the step of displaying the result from said computation only after all of the cells are selected.

10. A computer-implemented method as recited in claim 7, wherein the computing step comprises the step of computing the function using repeatedly all of the selected cells.

11. A computer-implemented method as recited in claim 7, wherein the computing step comprises the following steps:

temporarily storing the result from said computation using all previously selected cells; and computing a new result using the stored result and one or more newly selected cells.

12. A storage medium having executable instructions comprising:

instructions to form a graphical user interface window having a plurality of cells operatively associated with a spreadsheet functionality and at least one data display region not operatively associated with the spreadsheet functionality;

indicator instructions to select a set of one or more of the plurality of cells;

auto-calculator instructions to automatically calculate an operator-defined function in which the set of cells selected by the indicator are sole inputs and to produce a result as the set of cells is being selected by the indicator; and interface instructions to immediately display the result computed by the auto-calculator as the set of cells is being selected in the at least one data display region not operatively associated with the spreadsheet functionality.

13. A storage medium as recited in claim 12, wherein the operator-function is from a group of functions comprising: summation, maximum, minimum, average, count, and count number.

14. A storage medium as recited in claim 12, wherein the instructions to form a graphical user interface window form a toolbar having the at least one data display region not operatively associated with the spreadsheet functionality.

15. A storage medium as recited in claim 12, wherein the instructions to form a graphical user interface window form a movable pointer and a tip window adjacent to the pointer, the tip window having the at least one data display region not operatively associated with the spreadsheet functionality.

16. A storage medium as recited in claim 12, wherein the auto-calculator instructions automatically calculates the operator-defined function each time the selected cells changes from a first group of cells to a second group of cells.

17. A storage medium as recited in claim 12, wherein the auto-calculator instructions automatically calculates the operator-defined function after all of the one or more cells have been selected.

18. A storage medium as recited in claim 12, wherein the auto-calculator instructions temporarily caches the result from a calculation involving all previously selected cells and automatically calculates a new result using the cached result and one or more newly selected cells.

19. A computer comprising:

a memory;

a processor;

a display;

an application stored in memory and executable on the processor, the application presenting on the display a graphical user interface having a plurality of selectable cells operatively associated with a spreadsheet functionality and at least one data display region not operatively associated with the spreadsheet functionality;

the application being configured to automatically calculate an operator-defined function based solely on one or more selected cells as inputs to produce a result and to immediately display the result in the at least one data display region not operatively associated with the spreadsheet functionality as those cells are selected.

20. A computer as recited in claim 19, wherein the operator-defined function is from a group of functions comprising: summation, maximum, minimum, average, count, and count number.

21. A computer as recited in claim 19, wherein:

the graphical user interface further includes a toolbar adjacent to the plurality of cells, the toolbar having the at least one data display region not operatively associated with the spreadsheet functionality.

22. A computer as recited in claim 19, wherein:

the graphical user interface further includes a movable pointer for selecting the cells and a tip window beside the pointer, the tip window having the at least one data display region not operatively associated with the spreadsheet functionality.

23. A computer as recited in claim 19, wherein the application is configured to automatically calculate the function and immediately display the result each time the selected cells changes from a first group of cells to a second group of cells.

* * * * *